United States Patent [19]
Brackett et al.

[11] Patent Number: 5,751,587
[45] Date of Patent: May 12, 1998

[54] METHOD FOR CREATING A CONJUGATED PROFILE CORRESPONDING TO A CONJUGATE SURFACE IN A MOTION CONVERSION DEVICE

[76] Inventors: Douglas C. Brackett, 2535 Mason Oaks Dr., Valricho, Fla. 33594; William R. Wister, III, Runnymede Farm, Rd 3, Coatesville, Pa. 19320

[21] Appl. No.: 857,486

[22] Filed: May 16, 1997

Related U.S. Application Data

[63] Continuation of Ser. No. 468,426, Jun. 6, 1995, Pat. No. 5,661,655.

[51] Int. Cl.$^6$ .............................. G06F 19/00; F16H 21/18
[52] U.S. Cl. ................... 364/474.24; 364/474.29; 74/49; 74/50
[58] Field of Search ..................... 364/474.24, 474.25, 364/474.26, 474.29, 474.37; 318/570; 74/49; 6/50

[56] References Cited

U.S. PATENT DOCUMENTS

| | | | |
|---|---|---|---|
| 5,259,256 | 11/1993 | Brackett | 74/49 |
| 5,351,567 | 10/1994 | Brackett | 74/49 |
| 5,445,039 | 8/1995 | Brackett | 74/49 |
| 5,456,159 | 10/1995 | Brackett | 92/138 |
| 5,500,927 | 3/1996 | Sander-Cederlof et al. | 395/133 |

*Primary Examiner*—Paul P. Gordon
*Attorney, Agent, or Firm*—Finnegan, Henderson, Farabow, Garrett & Dunner, L.L.P.

[57] ABSTRACT

A method of creating a conjugated surface for use in a motion conversion device for converting linear motion into circular motion or vice versa through the use of an axially movable conjugate-driver moving laterally with respect to a conjugate-bearing, the conjugated surface being on the conjugate-bearing. The method includes the steps of creating a motion curve corresponding to the circular motion from the frame of reference of the lateral motion, iteratively rotating the conjugate surface :along the motion curve, and measuring a conjugated curve comprising the points of the conjugate surface farthest from a line joining the two endpoints of the motion curve during the course of the rotations. The conjugated surface is created according to the conjugated curve.

23 Claims, 8 Drawing Sheets

METHOD FOR CREATING A CONJUGATED PROFILE CORRESPONDING TO A CONJUGATE SURFACE IN A MOTION CONVERSION DEVICE

CROSS REFERENCE TO RELATED APPLICATIONS

This is a continuation of application Ser. No. 08/468,426, filed Jun. 6, 1995, now U.S. Pat. No. 5,661,655 (26 Aug. 1997). This application is related to U.S. Pat. No. 5,259,256, to Douglas C. Brackett, the contents of which are hereby incorporated by reference.

BACKGROUND OF THE INVENTION

The present invention relates to devices for converting between linear motion and rotary motion, and, more particularly, to a method for creating a "conjugated surface" from a "conjugate surface" for a device that converts between linear motion and rotary motion according to particular parameters of motion transfer. A "conjugate surface" has a tracking profile that either tracks or is tracked by the profile of a "conjugated surface" during motion conversion.

U.S. Pat. No. 5,259,256, to Douglas C. Brackett, one of the inventors of this invention, discloses a motion conversion device which translates linear motion to rotary motion using a conjugate-driver. A "conjugate-driver" component engages a "conjugate-bearing" without any clearance between the mechanical components throughout their full range of motion. As the engagement occurs along tracking and trackable profiles or "undulations," linear motion converts to rotary motion.

In one embodiment, this is implemented by the motion conversion device shown in FIG. 1. The conjugate drive mechanism includes a pair of conjugate-drivers 10 and 15 and a shuttle 20 containing a pair of conjugate-bearings that moves in a reciprocating fashion along a rectilinear path. The shuttle includes an aperture 25 with two sides. One side is defined by a first trackable profile 30 corresponding to the first conjugate-bearing, and the opposite side is defined by a second trackable profile 35 corresponding to the second conjugate-bearing. One of the conjugate-drivers 10 has a surface of a first tracking profile 40 having the same circumferential length as the first trackable profile 30. The other conjugate-driver 15 has a surface of a second tracking profile 45 having the same circumferential length as the second trackable profile 35. The "circumferential length" of a profile or a surface is to the total circumference of the curved portions that make up the profile or surface.

The conjugate drive mechanism also includes a rotatable crankshaft 50 having a crankpin, positioned within the aperture 25 of the shuttle, that revolves in a circular path. The two conjugate-drivers 10 and 15 are rotatably mounted on the crankpin 50. The first and second tracking profiles 40 and 45 on the conjugate-drivers engage the first and second trackable profiles 30 and 35 of the first and second conjugate-bearings, respectively, in a continuous conjugating manner as the crankpin revolves in the circular path. In this way the reciprocating rectilinear motion of the shuttle is continuously converted into the rotary motion of the crankshaft.

By manipulating the tracking and trackable profiles and their profiles, a system designer may control aspects of the operation of the motion conversion device. For example, in a piston engine, the designer may set the location of the peak position of the pistons, the stroke length of the pistons, the location of piston peak velocity, piston mean velocity, piston acceleration and deceleration, and piston dwell at top and bottom.

Prior to this invention, the only way to create a tracking profile and a trackable profile was by trial and error. A designer would create one surface to provide a desired set of parameters, and would approximate a matching surface based upon his or her best guess as to the proper shape. Using the approximation, the designer runs tests or simulations and iteratively modifies the design of the matching surface to engage the first surface in a continuous conjugating manner.

This trial and error process, however, is inefficient, time consuming, and prone to error. To use a different set of parameters for motion transfer, the designer would have to create a whole new first profile surface and engage in the trial and error process again to ensure the design of a proper matching profile surface. This severely limits the flexibility of the conjugate-driver and the conjugate-bearing in a device for motion transfer by imposing a very high initial cost on any new system design, and makes it difficult to design corresponding tracking or trackable profiles.

It is desirable, therefore, to devise a manner in which to create the corresponding tracking and trackable profile surfaces quickly and efficiently.

SUMMARY OF THE INVENTION

Accordingly, the present invention is directed to a method of creating a conjugated surface from a conjugate surface that substantially obviates one or more of the problems due to limitations and disadvantages of the related art.

In accordance with one aspect of the invention, a conjugated surface is created for use in a motion conversion device given a particular conjugate surface and a group of desired system parameters. The motion conversion device is used to transfer linear motion into circular motion or vice versa through the use of an axially movable conjugate-driver moving laterally with respect to a conjugate-bearing, while pivoting with respect to the conjugate bearing surface. The conjugate surface is on the conjugate-driver and the conjugated surface is on the conjugate-bearing.

The creation of the conjugated surface includes the steps of creating a motion curve corresponding to the circular motion of the conjugate-driver from a frame of reference of the lateral motion, iteratively rotating the conjugate surface along the motion curve, and measuring a conjugated curve comprising the points of the conjugate surface farthest from a line joining the two endpoints of the motion curve during the course of the rotations. The conjugated surface is created according to the conjugated curve by any of a number of creation techniques.

To achieve these and other advantages and in accordance with the purpose of the invention, as embodied and broadly described, the invention recites an automatic method of determining a conjugated curve corresponding to the shape of a conjugated surface for a motion conversion device that converts linear and circular motion using an axially-movable conjugate-driver, having a conjugate surface moving with respect to a conjugate-bearing having the conjugated surface, the method including the steps, performed by a data processor, of: determining creating a motion curve corresponding to the circular motion of the conjugate-driver from the frame of reference of lateral motion of the conjugate-driver with respect to the conjugate-bearing; rotating the conjugate surface along the motion curve; measuring points forming the conjugated curve from successive sets of points of the conjugate surface farthest from a line joining the two endpoints of the motion curve as the conjugate surface is rotated along the motion curve; and creating the conjugated surface from the conjugated curve.

The invention also recites an automatic method of determining a conjugated curve corresponding to the shape of a conjugated surface in a motion conversion device having a conjugate surface on a conjugate-driver that moves angularly with respect to its centerpoint, the centerpoint of the conjugate-driver moving in a circular path around a center of revolution, the method including the steps, performed by a data processor, of: determining a motion curve corresponding to the movement of the centerpoint of the conjugate-driver with respect to a conjugate-bearing; choosing a current first motion point along the motion curve corresponding to a first point of motion of the conjugate-driver; choosing an current second motion point a set distance from the current first motion point along the motion curve, the current second motion point corresponding to an second point of motion of the conjugate-driver; creating a connecting line between the current first motion point and the current second motion point; creating a first pivot line from a midpoint of the connecting line to a pivot point on the conjugate surface, the first pivot line being perpendicular to the connecting line; rotating the conjugate surface along the pivot point by an amount equal to an angle between a second pivot line from the current first motion point to the pivot point and a third pivot line from the current second motion point to the pivot point; setting a new first motion point, different from the current first motion point, and choosing a new second motion point the set distance from the new first motion point along the motion curve; repeating the steps of creating connecting lines and pivot lines and rotating the conjugate surface until the connecting lines have traversed the entire circumference of the motion curve and a plurality of positions of the conjugate surface have been determined; and creating a conjugated curve comprising the portions of the plurality of conjugate surface positions that comprise a continuous outer line not intersected by any of the plurality of conjugate surface positions or any of the pivot lines.

In addition, the invention recites an apparatus for deriving a conjugated curve for creating a conjugated surface for use in a motion conversion device for converting linear motion into circular motion or vice versa through the use of an axially movable conjugate-driver having a conjugate surface, the conjugate-driver moving laterally with respect to a conjugate-bearing, the conjugated surface being on the conjugate-bearing, the apparatus comprising: means for creating a motion curve corresponding to the circular motion from the frame of reference of the lateral motion; means for iteratively rotating the conjugate surface along the motion curve; and means for measuring a conjugated curve comprising the points of the conjugate surface farthest from a line joining the two endpoints of the motion curve during the course of the rotations.

Additional features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

DESCRIPTION OF PREFERRED IMPLEMENTATIONS

Reference will now be made in detail to the construction and operation of preferred implementations of the present invention which are illustrated in the accompanying drawings. In those drawings, like elements and operations are designated with the same reference numbers.

This description of the preferred implementations of the present invention is for the purposes of description only and does limit the invention only to these implementations. For example, in the preferred implementation the conjugate-driver has the conjugate surface and the conjugate-bearing has the conjugated surface. This invention can also be used to derive the surface of the conjugate-driver based on the surface of the conjugate-bearing. In addition, although the preferred implementations use only a pair of conjugate-drivers and related conjugate-bearings, the number of sets of conjugate-drivers and conjugate-bearings may vary.

Figure 1:
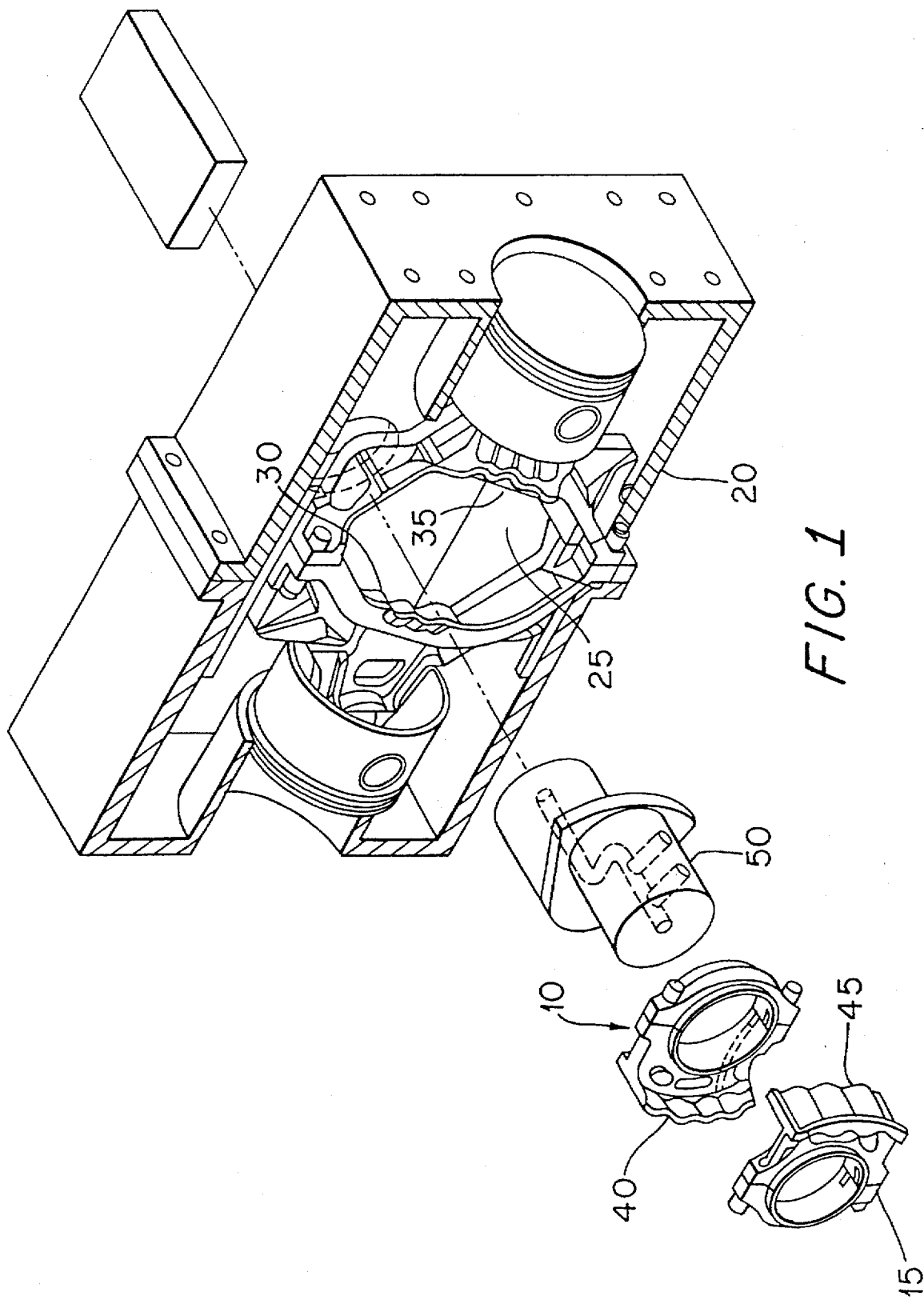
FIG. 1 is a diagram of motion conversion device.
Figure 2:
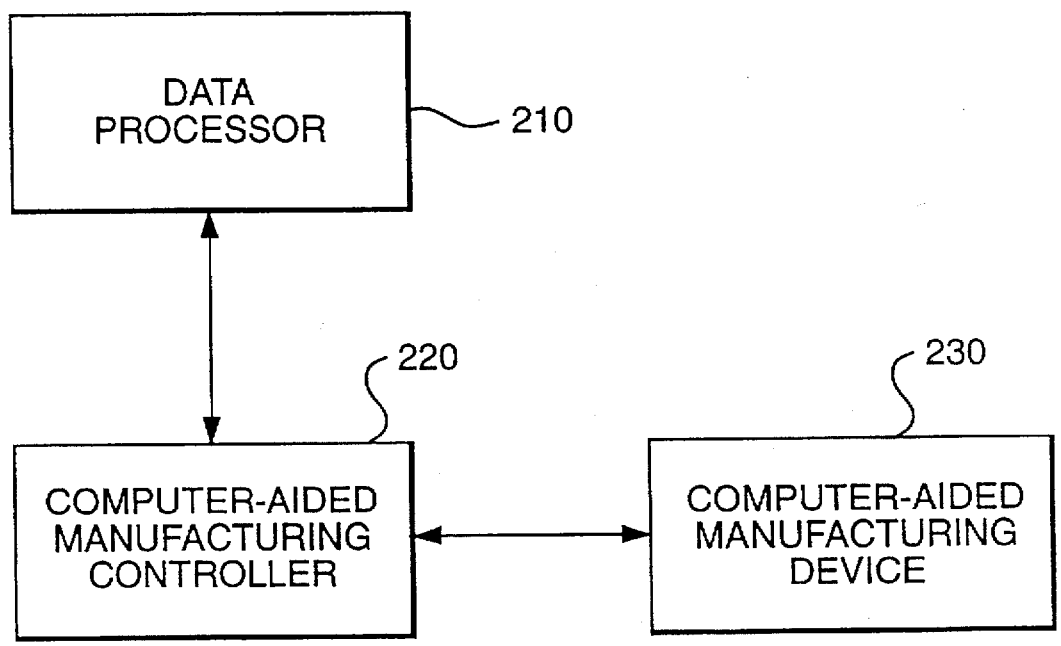
FIG. 2 is a block diagram of a preferred implementation of the present invention of an apparatus for determining a conjugated surface from a conjugate surface and manufacturing the conjugated surface.

As shown in FIG. 2, the design of the conjugated surface is preferably implemented by a data processor 210. In the preferred embodiment, the data processor 210 is a Macintosh Quadra 950, although any data processor capable of performing the necessary steps may be used. After it has determined the design of the conjugated data, the data processor 210 preferably provides data regarding that design to a computer-aided manufacturing controller 220. Computer-aided manufacturing controller 220 in turn controls a computer-aided manufacturing device 230 to create the conjugated surface from the data received from data processor 210.

Computer-aided manufacturing device 230 may be, for example, a device for cutting the conjugated surface from a blank, a device for shaving or grinding the conjugated surface, or a device for molding the conjugate surface out of a desired material. In fact, computer-aided manufacturing device 230 may be any device capable of creating a conjugate-bearing having the conjugated surface represented by information received from the data processor 210 through the computer-aided manufacturing controller 220.

Figure 3:
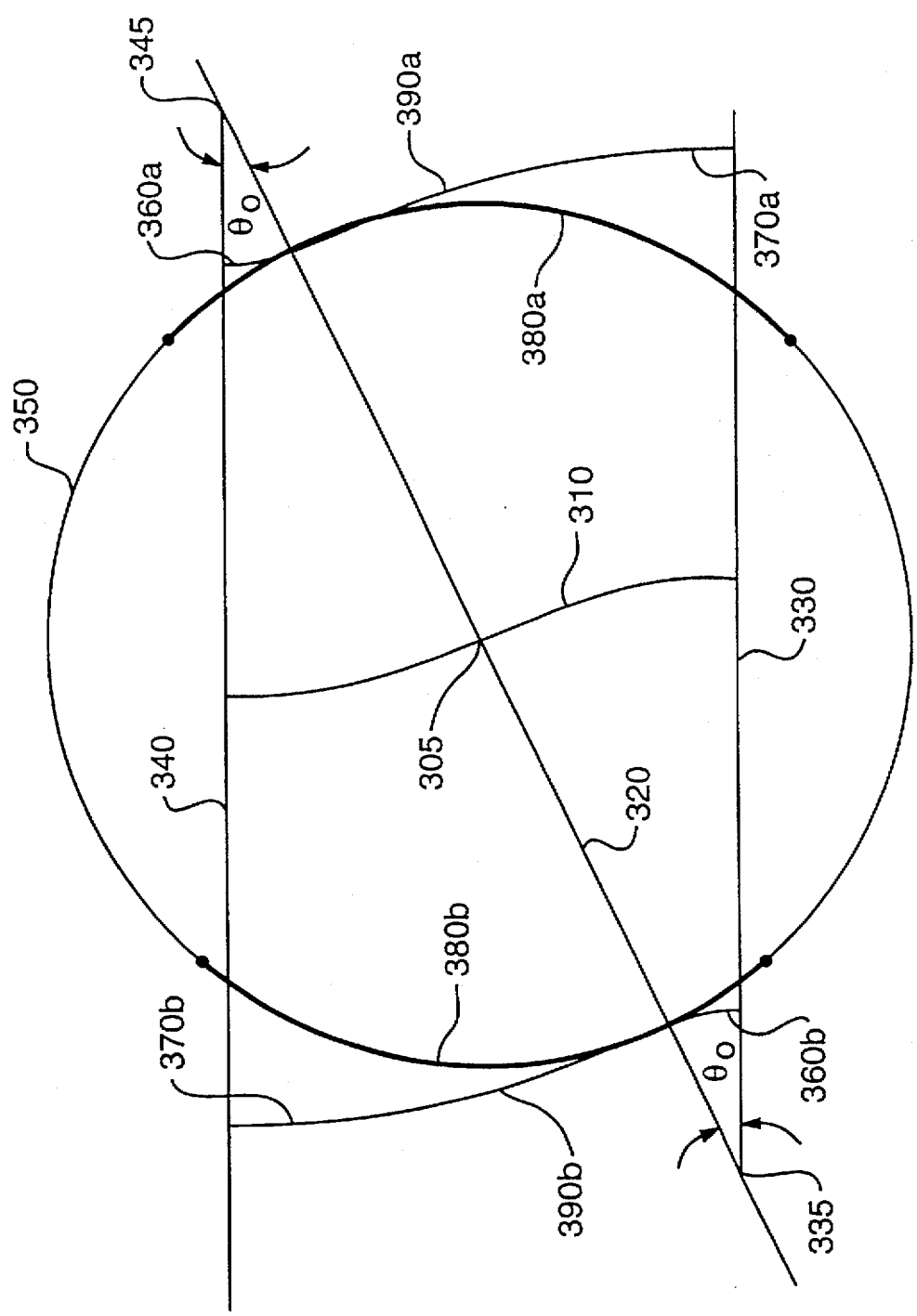
FIG. 3 is a diagram of the motion characteristics of the conjugate-drivers and conjugate-bearings created in accordance with a preferred implementation of the present invention.

The design of a conjugated surface begins with the formation of a design for a conjugate surface from which the conjugated surface is derived. FIG. 3 shows an example of the motion characteristics of a pair of conjugate-drivers from the frame of reference of a pair of connected conjugate-bearings. Each conjugate-driver has a conjugate surface and each conjugate-bearing has a conjugated surface derived from the conjugate surface on its mating conjugate-driver.

As shown in FIG. 3, a motion curve 310 indicates the motion of each of the conjugate-drivers with respect to the conjugate-bearings. Motion curve 310 has a design line 320 passing through it, set to be at a design angle $\theta_D$ from a each of first and second parallel lines 330 and 340, respectively, intersecting the endpoints of the motion curve 310. The design line intersects the first parallel line 330 at a first design line endpoint 335 and intersects the second parallel line 340 at a second design line endpoint 345.

In a preferred implementation the motion of each conjugate-driver is defined by an arc on a circle 350 representing apparent pitch surfaces 380a and 380b, respectively, for each conjugate driver. Circle 350 has a radius r around a centerpoint 305 on, the emotion curve 310 where design line 320 intersects motion curve 310. In this preferred implementation the centerpoint 305 corresponds to the center of the motion curve. In alternate implementations, however, the design line may be skewed from the center of the motion curve, and the centerpoint 305 will be likewise displaced. In addition, in alternate embodiments circle 350 can be replaced with an ellipse, a pair of parabolic curves, or any other desired curve or curves.

The conjugate-driver apparent pitch surfaces 380a and 380b are imaginary lines that form the foundation of the conjugate surfaces on the conjugate-drivers in the same way that a circle forms the foundation of a simple gear. The apparent pitch surfaces 380a and 380b also describe the motion of conjugate-drivers in the same way that a circle describes the motion of a simple gear.

The two points where circle 350 intersects design line 320 form two pairs of arcs between the design line 320 and the first and second parallel lines 330 and 340. Each pair of arcs includes a small arc 360a and 360b and a large arc 370a and 370b. At each intersection point, one of each pair of arcs, for example arcs 370a and 360b, or 360a and 370b has the first design line endpoint 335 as its radial center, and the other arc in each pair, for example, has the second design line endpoint 345 as its radial center.

The curved line formed by the pairs of arcs 360a and 370a, and 360b and 370b, represents the apparent pitch surface 390a or 390b for the conjugate-bearing. Just like apparent pitch surfaces 380a and 380b, conjugate-bearing apparent pitch surfaces 390a and 390b are imaginary lines that form the foundation of the conjugated surfaces on the conjugate-bearings and describe their motion.

As the conjugate-drivers move in accordance with the motion curve 310, the centerpoint 305 of the circle 350 moves along the motion curve 310 and the two conjugate-driver apparent pitch surfaces 380a and 380b rotate around the centerpoint of the circle independently of each other in opposite arcuate directions. During this rotation, each of the conjugate-driver apparent pitch surfaces 380a and 380b keeps in constant contact with its respective conjugate-bearing apparent pitch surface 390a or 390b. Although during operation of a motion transfer device the conjugate-bearings are in motion, the apparent geometries of the lines 320, 330, and, 340, and apparent pitch surfaces 390a and 390b shown in FIG. 3 remain fixed with respect to each other. The geometries including these components move as a group, fixed in their planes rather than moving separately; they can move laterally, but they do not rotate or move vertically. In the preferred implementation, this corresponds to the two conjugate-bearings fixed on a common laterally moving shuttle. FIG. 3 is drawn from the frame of reference of the shuttle, and consequently no movement of the apparent pitch surfaces 390a and 390b is shown.

As the conjugate-driver apparent pitch surfaces 380a and 380b move, they keep in constant contact with their corresponding conjugate-bearing apparent pitch surfaces 390a and 390b, despite some "slippage." Slippage occurs because the two pitch surfaces 380a and 390a or 380b and 390b move at different velocities with respect to each other because they have different circumferential lengths. Different circumferential lengths precludes point-to-point contact, so slippage inevitably occurs.

If this contact were between physical surfaces, the slippage would cause friction between the two apparent pitch surfaces 330a and 390a or 380b and 390b. However, since these pitch surface; are imaginary, no friction results.

This operation differs from the operation of simple gears in which the imaginary pitch surfaces for the gears have no slippage but the true pitch surfaces of the gears experience slippage. In the design of this invention, the true pitch surfaces have no slippage, whereas the imaginary pitch surfaces experience slippage.

Figure 4:
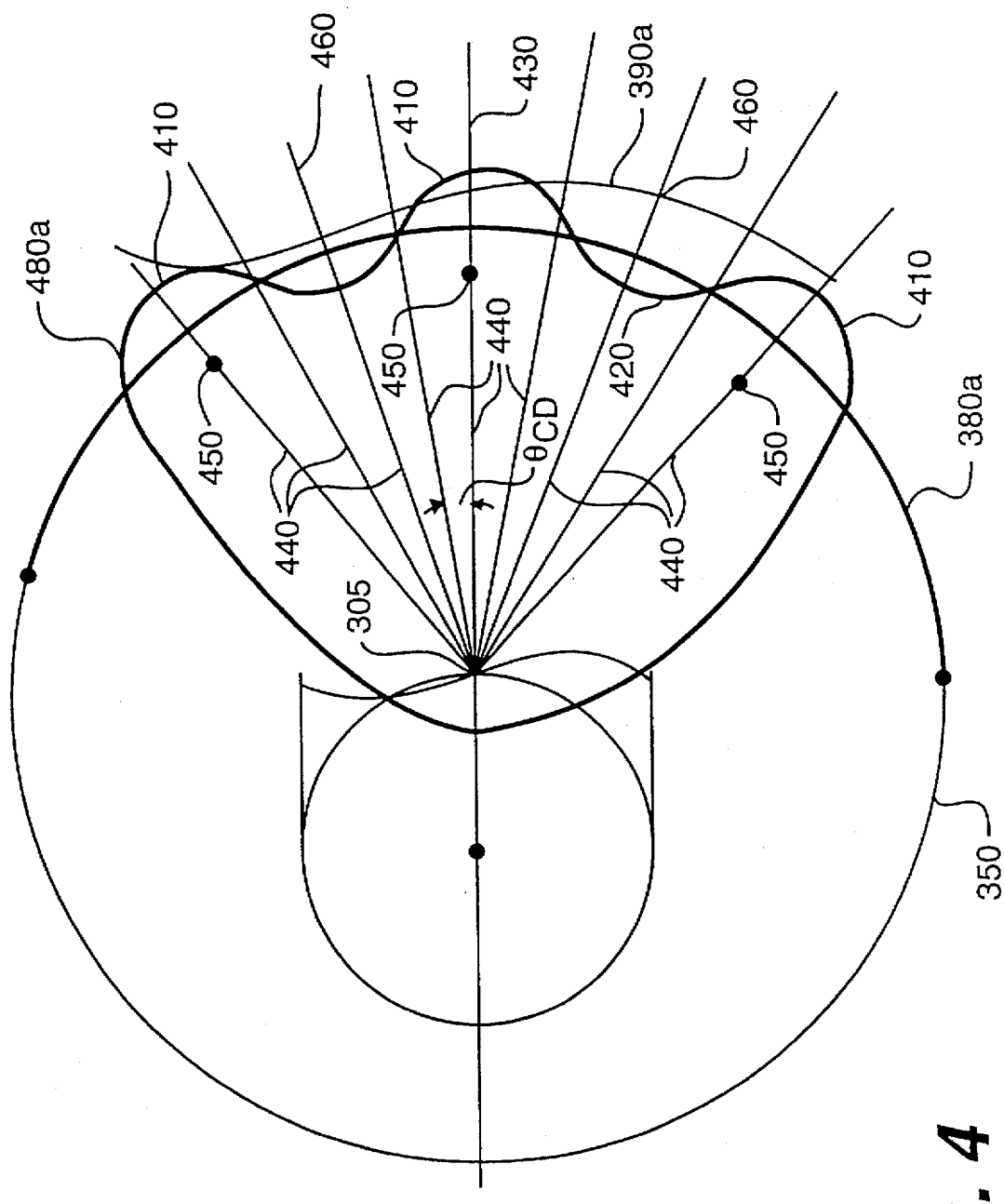
FIG. 4 is a diagram of a conjugate-driver having a conjugate surface created in accordance with a preferred implementation of the present invention.

FIG. 4 shows how to form a conjugate-driver true pitch surface 480a in relation to a conjugate-driver apparent pitch surface 380a. The conjugate-driver true pitch surface 480a represents the true surface of one of the conjugate-drivers. A similar conjugate-driver true pitch surface (not shown) corresponds to conjugate-driver apparent pitch surface 380b. The following description applies to either conjugate driver true pitch surface. In a preferred implementation, conjugate-driver true pitch surface 480a is the conjugate surface from which the conjugated surface, i.e., a conjugate-bearing true pitch surface, is derived.

As shown in FIG. 4, the conjugate-driver true pitch surface 480a includes a series of alternating nodes 410 and valleys 420. Since the nodes 410 and valleys 420 alternate, the number of nodes 410 and the number of valleys 420 must either be identical or differ by one.

Data processor 210 determines nodes 410 and valleys 420 according to the following method. First, data processor 210, under program control, creates primary line 430 from the centerpoint 305 of the circle 350 to a point on the conjugate-driver apparent profile surface 380a or 380b. In FIG. 4, primary line 430 intersects the midpoint of the conjugate-driver apparent pitch surface 380a. In alternate embodiments, however, the point of intersection may vary, such as to effect harmonic dampening.

Next, data processor 210 creates a series of profile feature lines 440, also extending from centerpoint 305 of the circle 350, such that one profile feature line 440 is coincident with the primary line 430 and the remaining profile feature lines are radially displaced from the primary line 430 by an integral multiple of a profile feature radial angle $\theta_{CD}$.

As shown in FIG. 4, each node 410 or valley 420 is defined by three profile feature lines 440, a radius, and a centerpoint. Adjoining nodes 410 and valleys 420 each share one profile feature lines 440.

The nodes 410 are arcs no more than 180° formed outside the circle 350. The nodes 410 each have a node centerpoint 450 on or inside circle 350, a node radius $R_1$, and endpoints on the surface of the circle 350. One profile feature line 440 intersects the midpoint of the arc forming each node 410, and the profile feature lines 440 adjacent to the profile feature line 440 intersects the arcs endpoints.

The valleys 420 are also arcs of no more than 180° formed inside the circle 350 with a valley centerpoint 460 on or outside the circle 350, a valley radius $R_v$, and endpoints on the surface of the circle 350. As with the nodes 410, one profile feature line 440 intersects the arc forming each valley 420 at its midpoint and profile feature lines 440 adjacent to the profile feature line intersecting the midpoint of the arc intersect the arcs endpoints.

In its initial position, the conjugate-driver true pitch surface 480a will be tangentially adjacent to the conjugate-bearing apparent pitch surface 390a at one point. It is not necessary, however, for conjugate driver true pitch surface to touch the line 390a.

To create a conjugated surface based on the conjugate-driver true pitch surface 480a as a conjugate surface, data processor 210 must determine what surface would have the same circumferential length as the conjugate-driver true pitch surface 480a and have a point to point contact with the conjugate-driver true pitch surface 480a throughout the entire course of motion. To accomplish this objective, data processor 210 incrementally moves the conjugate-driver true pitch surface 480a in accordance with its motion characteristics, and records its position in first through Nth conjugate-driver true pitch surface positions. The movement of the conjugate-driver true pitch surface is determined by the following process demonstrated with reference to FIGS. 5 and 6.

Figure 5:
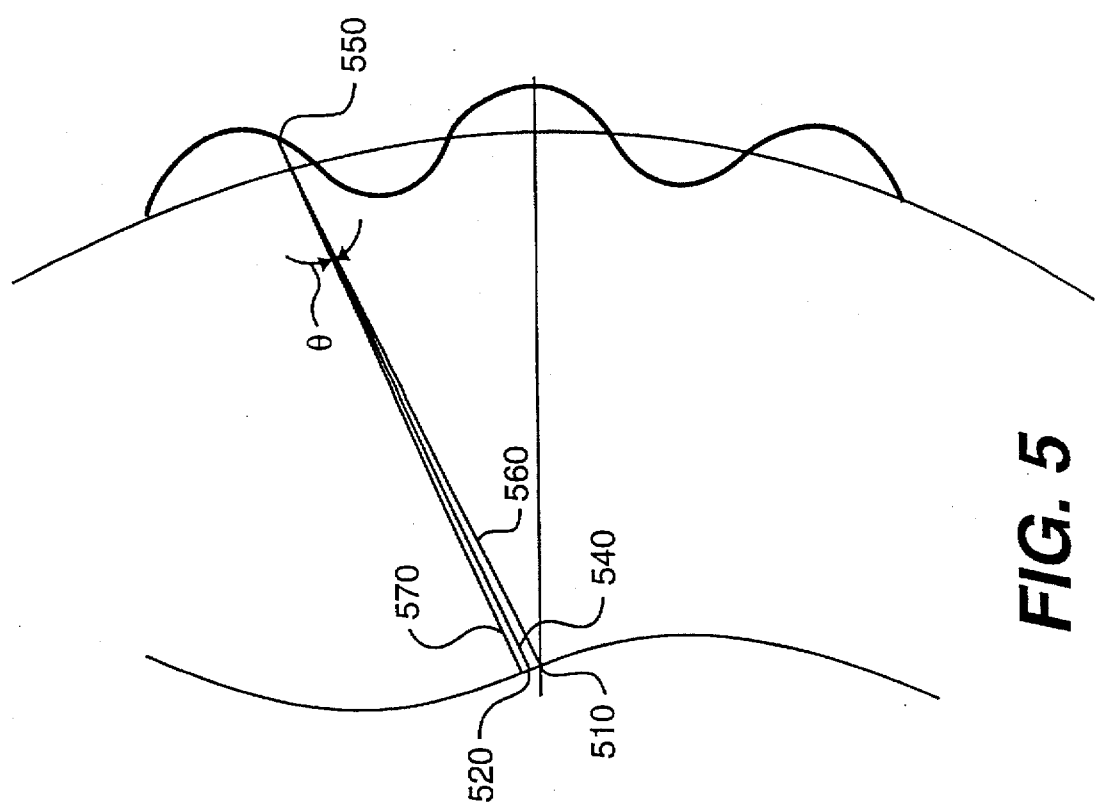
FIG. 5 is a diagram showing the motion of a conjugate-driver along the motion line in accordance with a preferred implementation of the present invention.

As shown in FIG. 5, data processor 210 chooses a first motion point 510 on the motion curve 310, as the first position of the conjugate-driver true pitch surface 480a. Data processor 210 then chooses a second motion point 520 on the motion curve 310 a predetermined circumferential distance from the first motion point 510, as a second position of the conjugate-driver true pitch surface 480a after the incremental movement.

Figure 6:
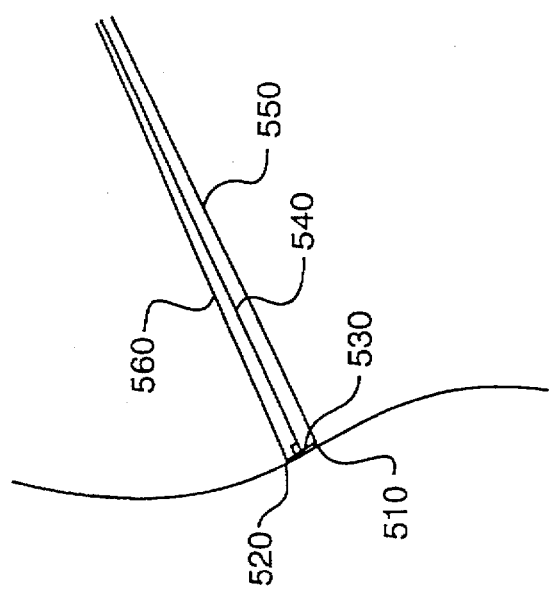
FIG. 6 is a diagram showing an expanded view of a portion of the motion curve in FIG. 5 in accordance with a preferred implementation of the present invention.

Next, data processor 210 draws a connecting line 530 between first motion point 510 and second motion point 520. Then data processor 210 draws a first pivot line 540 at the midpoint of the connecting line 530, perpendicular to the connecting line 530. The first pivot line 540 extends from the connecting line 530 to the conjugate-driver true pitch surface 480a. The point at which the first pivot line 540 intersects the conjugate-driver true pitch surface 480a is the pivot point 550. Next, data processor 210 draws second and third pivot lines 560 and 570 between the pivot point 550 and the first motion point 510 and second motion point 520, respectively. FIG. 6 shows an enlargement of the portion of the motion curve 310 including the first motion point 510 and the second motion point 520. The extreme ends of the motion curve are based on twice the radius of the motion of the crankshaft, i.e., crank radius, when the crank radius is perpendicular to the stroke of the device. This corresponds to line 430 in the preferred implementation shown in FIG. 4.

In the next step, data processor 210 rotates the conjugate-driver true pitch surface about the pivot point 550 by an amount equal to the angle between the second and third pivot lines 560 and 570. The new position of the conjugate-driver true pitch surface 480a represents a second position of the conjugate-driver true pitch surface 480a.

Figure 7:
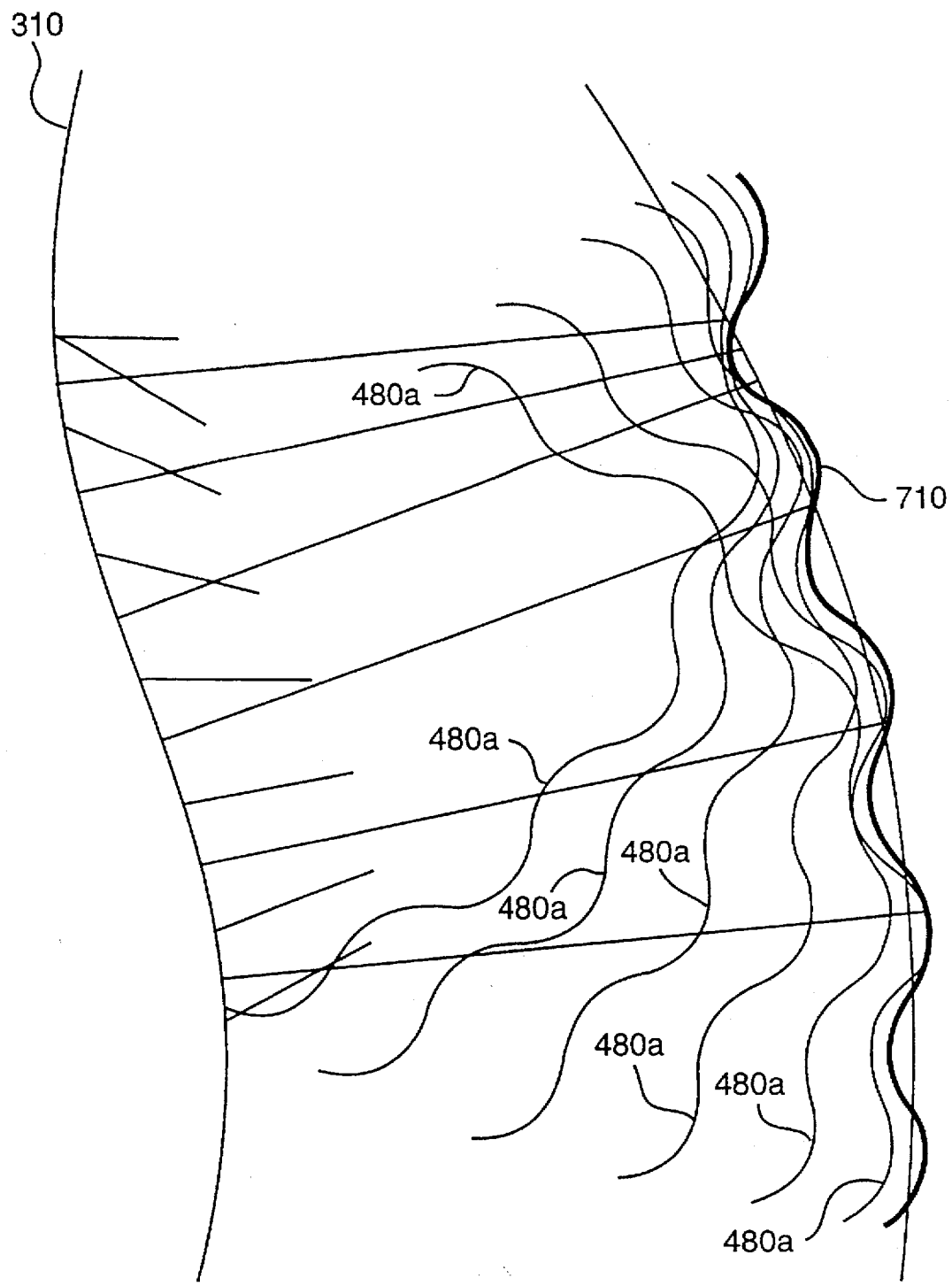
FIG. 7 is a diagram showing a conjugate-driver true pitch surface in first through Nth rotational positions used for deriving the conjugated surface, in accordance with a preferred implementation of the present invention.

Next, data processor 210 chooses a new first motion point on the motion curve 310 as the previous second motion point, and chooses a new second motion point the predetermined circumferential distance from the new first motion point along the motion curve 310. Data processor 210 then continues the method by implementing a new rotation as described above to determine a third position of the conjugate-driver true pitch surface. Data processor 210 repeats this process until the connecting lines 510 cover the entire circumferential length of the motion curve 310 and first through Nth positions of the conjugate-driver true pitch surface 480a have been determined. FIG. 7 shows the first through, Nth positions of a conjugate-driver true pitch surface 480a in a preferred implementation of the present invention.

Although in this preferred implementation each new starting point is chosen to be equal to the previous ending point, the invention is not limited to this implementation. The new first motion point can be any point as long as the new connecting line length and first motion point are not equal to the previous connecting line length and first motion point. The only restriction on the choice of first and second motion points is that the connecting lines between the various first and second motion points must cover the entire circumferential length of the motion curve 310. Thus, different connecting lines may cover common parts of the motion curve. However, no two connecting lines can cover identical portions of the motion curve 310 because no two connecting line lengths and first motion points are identical.

Data processor 210 then determines the shape of the conjugated surface by taking the portions of the first through Nth positions of the conjugate-driver true pitch surface 480a that form a continuous outer line that is not intersected by any of the first through Nth positions of the conjugate-driver true pitch surface 480a or any of the pivot lines 540, 560, or 570. The continuous outer line forms the shape of the conjugated surface 710a, the conjugate-bearing true pitch surface in this preferred implementation. The conjugated surface 710a has the same circumferential length as the conjugate-driver true pitch surface, i.e., the conjugate surface.

The accuracy of the conjugated surface shape increases as the number of rotations rises. The most accurate derivation of the conjugated surface requires an infinite number of rotations around an infinite number of pivot points. Because the shape of the conjugated surface is also limited by the accuracy of the method of creating the actual physical conjugated surface, however, the design of the surface in a preferred implementation need only be accurate to the limits of accuracy of the creation of the actual physical conjugated surface.

Figure 8:
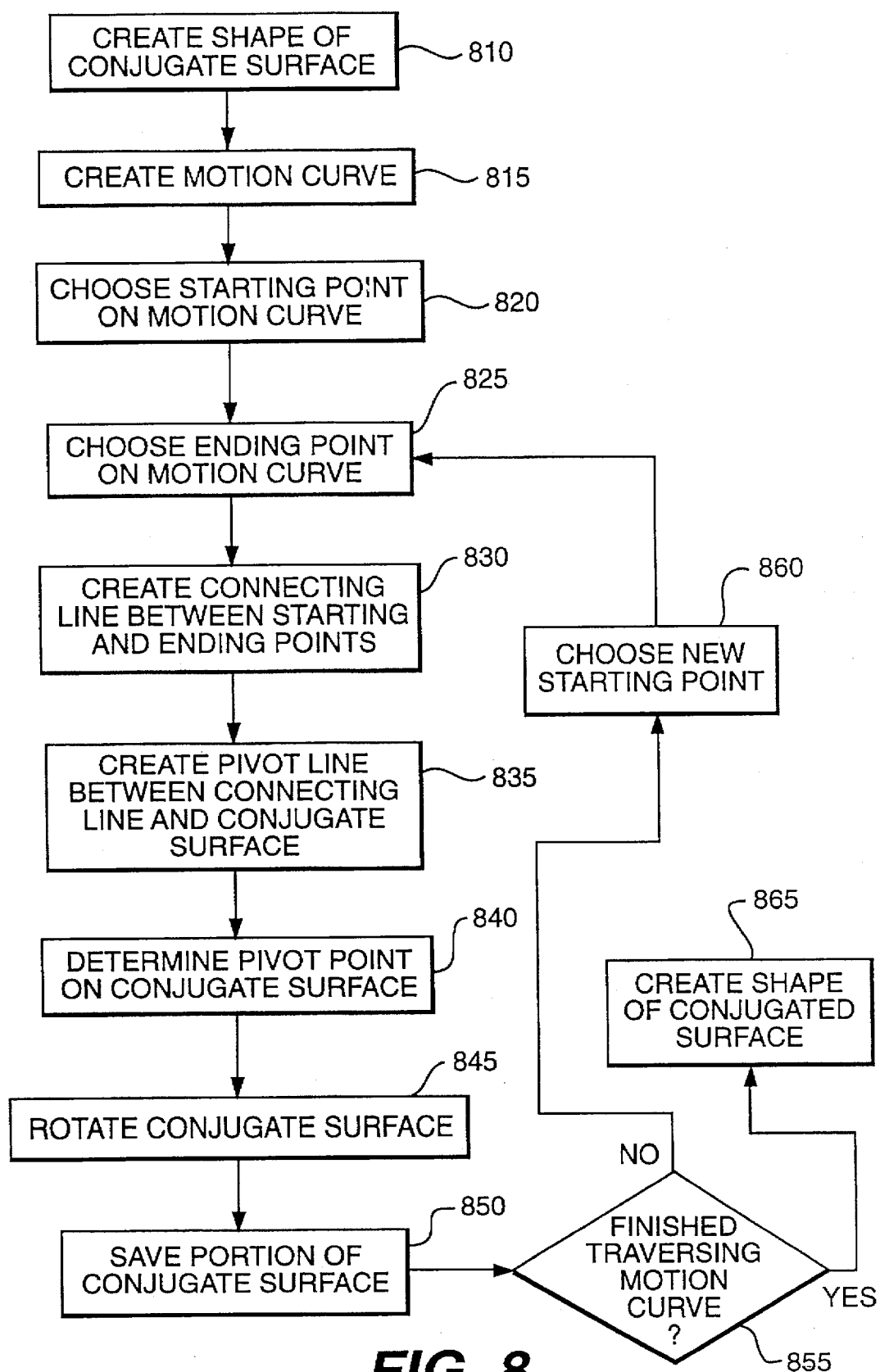
FIG. 8 is a flow chart showing the steps performed by the apparatus of FIG. 2 in determining a conjugated surface from a conjugate surface in accordance with a preferred implementation of the present invention.

FIG. 8 is a flow chart 800 illustrating the steps, including those described above, taken by the data processor 210 of the preferred implementation to determine the design of the conjugated surface in accordance with the above described method. In this implementation, the conjugate surface is the trackable profile from one of the conjugate-drivers.

As shown in FIG. 8, data processor 210 begins by creating the conjugate surface which will be used to determine the conjugated surface (step 810). Next, data processor 210 creates the motion curve corresponding to the motion of the conjugate-drivers with respect to the conjugate-bearings (step 815). Data processor 210 then chooses a starting point on the motion curve (step 820) and an ending point on the motion curve (step 825), and plots a connecting line between the starting point and ending point (step 830). Data processor 210 then creates a pivot line from the center of the connecting line and perpendicular to the connecting line (step 835). This allows data processor 210 to determine the pivot point as the point on the conjugate surface intersected by the pivot line (step 840).

After creating the pivot line and determining the pivot point, data processor 210 then rotates the conjugate surface along the pivot point by an amount equal to the angle between a first line from the starting point to the pivot point and a second line from the ending point to the pivot point (step 845) and saves the current position of the conjugate surface (step 850).

At this point, data processor 210 determines whether connecting lines have traversed the entire motion curve (step 855). If not, data processor 210 chooses a new staring point (step 860), and returns to step 825 to choose a new ending point. If data processor 210 determines that the motion curve has been fully traversed in step 855, then data processor 210 proceeds to create the shape conjugated surface based on the stored positions of the conjugate surface (step 865).

In an alternate preferred implementation, this invention may derive the shape of the final conjugated surface through the use of a temporary conjugated surface. The temporary conjugated surface is initially set to be identical to the conjugate surface, i.e., the conjugate-driver true pitch surface 480a in the alternate preferred implementation.

The temporary conjugate surface in this implementation is updated for each movement of the conjugate-driver true pitch surface 480a. Each time the conjugate-driver true pitch surface moves to a new position by rotation about a pivot point 550, the temporary conjugated surface is updated such that it comprises a continuous outer line not intersected by any of the conjugate-driver true pitch surface 480a, the current temporary conjugated surface, or pivot lines 540, 560, or 570 in the current position.

In a motion transfer device using this conjugated surface 710a, the conjugate-driver true pitch surface 480a and the conjugate-bearing true pitch surface, i.e., the conjugated surface 710a, are in constant contact with each other at a single point throughout the course of the motion of the conjugate-driver and the conjugate-bearing. Since the conjugate-driver true pitch surface 480a and the conjugate-bearing true pitch surface are identical in circumference and contact each other in a point to point relationship, no slippage occurs between these two surfaces. Furthermore, since the two true pitch surfaces experience no slippage, there is also no friction associated with their contact.

The conjugate-bearing true pitch surface is created on the conjugate-bearing based on the shape of the conjugated surface 710a by a computer-aided manufacturing device 230 as shown in FIG. 2.

Although in the preferred implementation described above, the conjugate surface is a set of regular nodes and valleys, the conjugate surface can be any surface that allows each of the first pivot lines 540 extending from the connecting lines 530 to intersect with the conjugate surface true pitch surface 480a at a single point and do not cross over any other first pivot lines 540. For example, the conjugate surface may have various arcuate sections, such as parabolic or elliptical arcs, or the surface may be a random set of nodes and valleys.

In addition, although in the preferred implementation described above, motion curve 310 is described as a pair of circular arcs, motion curve 310 may instead include parabolic segments, elliptical segments, or any other shape that may describe the motion of the conjugate-driver with respect to the conjugate-bearing.

Figure 9:
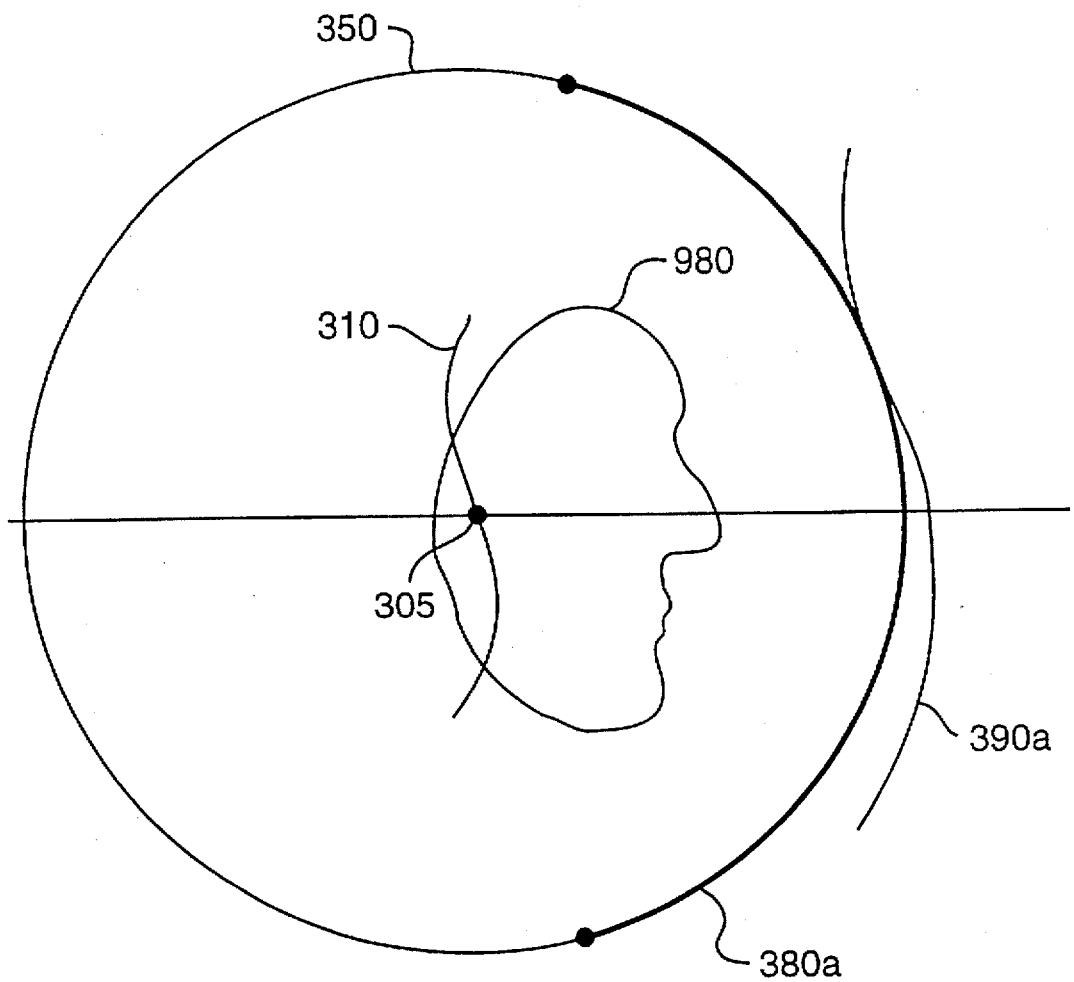
FIG. 9 is a diagram of a conjugate-driver having a conjugate created in accordance with an alternate preferred implementation of the present invention.

Also, although the trackable profile on the conjugate-driver in FIG. 4 is shown as a regular shape with uniform nodes and valleys, it need not be regular. In fact, it may be desirable to use odd shapes to avoid harmonics in the operation of the conjugate-driver mechanism. FIG. 9 shows an example of a irregular trackable surface serving as a true pitch surface 980 for the conjugate-driver. To show the variety of possible true pitch surfaces, the true pitch surface 980 in FIG. 9 is chosen to approximate the profile of a human head. Other shapes are also possible. The only restriction on the shape of a true pitch surface (i.e., conjugate surface) is that it must be possible to create a conjugated surface having a one-to-one connecting relationship with the conjugate surface.

Additionally, although the true pitch surface 480a corresponding to the trackable profile on the conjugate-driver in FIG. 4 is shown as crossing the circle 350, it need not cross the circle or appear on any particular side of the circle. FIG. 9 shows an example of a trackable profile used as a conjugate surface that appears totally within the circle 350. It would be possible, of course, to also have a trackable profile used as a conjugate surface that appears totally outside the circle 350.

Also, despite the fact that the preferred implementations described in this specification above use tracking profiles as the conjugate surfaces and trackable profiles as the conjugated surfaces, the tracking profile can be derived from the trackable i profile as well as the trackable profile being derived from the tracking profile by the methods disclosed herein.

This is accomplished by simply reversing the roles of the two profiles in the method described above. The calculations involving the motion curve, pivot lines, and pivot points are used to rotate the trackable profile, and the positions of the rotated trackable profile are used to determine the shape of the tracking profile.

Accordingly, the present invention allows for the creation of corresponding tracking and trackable profile surfaces quickly and efficiently without the need for a trial and error process. This allows for the rapid creation of tracking profile/trackable profile pairs with any of a variety of desired parameters.

While there has been illustrated and described what are at present considered to be preferred implementations and methods of the present invention, those skilled in the art will understand that various changes and modifications may be made and equivalents substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular implementations and methods disclosed herein, but that the invention include all implementations falling with the scope of the appended claims. For example, although the previous descriptions and preferred implementations are related to devices that convert linear motion to rotary motion, this invention is equally applicable to devices that convert rotary motion to linear motion.

We claim:

1. An automatic method of creating a conjugated curve, corresponding to a shape of a conjugated profile on a conjugate-bearing, from a conjugate surface on a conjugate-driver used in a motion conversion device, the method, performed by a data processor, comprising the steps of:

creating a motion curve corresponding to motion of the conjugate-driver;

rotating the conjugate surface of the conjugate-driver along the motion curve; and generating points forming the conjugated curve from successive sets of points on the conjugate surface as the conjugate surface rotates along the motion curve.

2. The method of claim 1, further comprising the step of creating the conjugated profile from the conjugated curve.

3. The method of claim 2, wherein the conjugated profile creating step includes the substep of performing one of shaving, cutting and abrading a material of a surface of the conjugate-bearing, such that the surface forms the conjugated curve.

4. The method of claim 2, wherein the conjugated profile creating step includes the substep of molding a material of a surface of the conjugate-bearing, such that the surface forms the conjugated curve.

5. The method of claim 2, wherein the conjugated profile creating step includes the substep of providing instructions to a computer aided manufacturing device for creating the conjugated profile on the conjugate-bearing, based on the conjugated curve.

6. An automatic method of creating a conjugated curve, corresponding to a shape of a conjugated profile on a conjugate-bearing, from a conjugate surface on a conjugate-driver used in a motion conversion device, the method, performed by a data processor, comprising the steps of:

creating a motion curve corresponding to movement of the conjugate-driver relative to the conjugate-bearing;

choosing motion points along the motion curve corresponding to points of motion of the conjugate-driver, each motion point being a set distance from a previous motion point;

creating a connecting line between two successive ones of the motion points;

creating a pivot line from a midpoint of the connecting line to a pivot point on the conjugate surface;

rotating the conjugate surface with respect to the pivot point to determine a position on the conjugate surface;

repeating the steps of creating a connecting line and a pivot line for successive motion points until the connecting lines have traversed the entire motion curve and a plurality of the positions of the conjugate surface have been determined; and creating the conjugated curve based on the plurality of conjugate surface positions.

7. The method of claim 6, wherein the pivot line creating step includes the substep of directing each pivot line to extend perpendicularly from the midpoints of respective connecting lines.

8. The method of claim 6, wherein the conjugate surface rotating step includes the substep of rotating the conjugate surface by an amount equal to an angle between one of the pivot lines drawn from a motion point to the pivot point and another one of the pivot lines drawn from a successive motion point to the pivot point.

9. The method of claim 6, wherein the conjugated curve creating step includes the substep of creating the conjugated curve based on the plurality of conjugate surface positions forming a continuous outer line.

10. The method of claim 6, further comprising the step of creating the conjugated profile from the conjugated curve.

11. The method of claim 10, wherein the conjugated profile creating step includes the substep of performing one of cutting, shaving and abrading a material of a surface of the conjugate-bearing, such that the surface forms the conjugated curve.

12. The method of claim 10, wherein the conjugated profile creating step includes the substep of molding a material of a surface of the conjugate-bearing, such that the surface forms the conjugated curve.

13. The method of claim 10, wherein the conjugated profile creating step includes the substep of providing instructions to a computer aided manufacturing device for creating the conjugated profile on the conjugate-bearing, based on the conjugated curve.

14. An apparatus for automatically creating a conjugated curve, corresponding to the shape of a conjugated profile on a conjugate-bearing, from a conjugate surface on a conjugate-driver used in a motion conversion device, the apparatus comprising:

means for creating a motion curve corresponding to the motion of the conjugate-driver;

means for iteratively rotating the conjugate surface along the motion curve;

means for locating a plurality of points on the conjugate surface as the conjugate surface rotates along the motion curve; and means for forming a conjugated curve from the plurality of points located on the conjugate surface during the course of rotations.

15. The apparatus of claim 14, further comprising a computer aided manufacturing means for creating the conjugated profile from the conjugated curve.

16. An apparatus for automatically creating a conjugated curve, corresponding to the shape of a conjugated profile on a conjugate-bearing, from a conjugate surface on a conjugate-driver used in a motion conversion device, the apparatus comprising:

means for creating a motion curve corresponding to movement of the conjugate-driver relative to the conjugate-bearing;

means for choosing motion points along the motion curve corresponding to points of motion of the conjugate-driver, each motion point being a set distance from a previous motion point;

means for creating a connecting line between two successive ones of the motion points;

means for creating a pivot line from a midpoint of the connecting line to a pivot point on the conjugate surface;

means for rotating the conjugate surface with respect to the pivot point to determine a position on the conjugate surface;

means for determining a plurality of positions on the conjugate surface as the conjugate surface rotates about successive pivot points which traverse the motion curve; and means for creating the conjugated curve based on the plurality of conjugate surface positions.

17. The apparatus of claim 16, wherein the pivot line creating means includes means for directing each pivot line perpendicularly to extend from the midpoint of respective connecting lines.

18. The apparatus of claim 16, wherein the conjugate surface rotating means includes means for rotating the conjugate surface by an amount equal to an angle between one of the pivot lines drawn from a motion point to the pivot point and another of the pivot lines drawn from a successive motion point to the pivot point.

19. The apparatus of claim 16, wherein the conjugated curve creating means includes creating the conjugated curve based on the plurality of conjugate surface positions forming a continuous outer line.

20. The apparatus of claim 16, further comprising a computer aided manufacturing means for creating the conjugated profile from the conjugated curve.

21. The apparatus of claim 20, wherein the conjugated profile creating means includes means for providing instructions to the computer aided manufacturing means to create the conjugated profile on the conjugate-bearing, based on the conjugated curve.

22. The apparatus of claim 20, wherein the conjugated profile creating means includes performing one of cutting, shaving and abrading a material of a surface of the conjugate-bearing, such that the surface forms the conjugated curve.

23. The apparatus of claim 20, wherein the conjugated profile creating means includes means for molding a material of a surface of the conjugate-bearing, such that the surface forms the conjugated curve.

\* \* \* \* \*